July 2, 1929.  H. M. STOLLER ET AL  1,719,491
ELECTRIC REGULATOR
Filed June 21, 1927
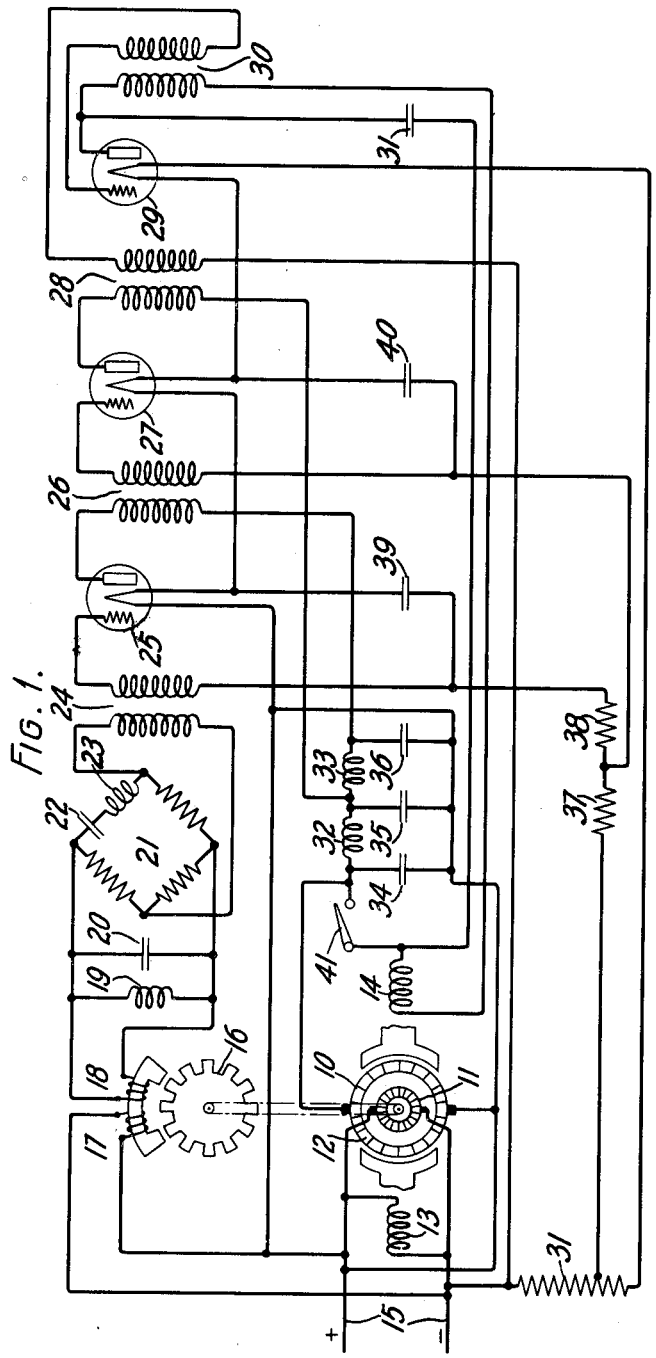
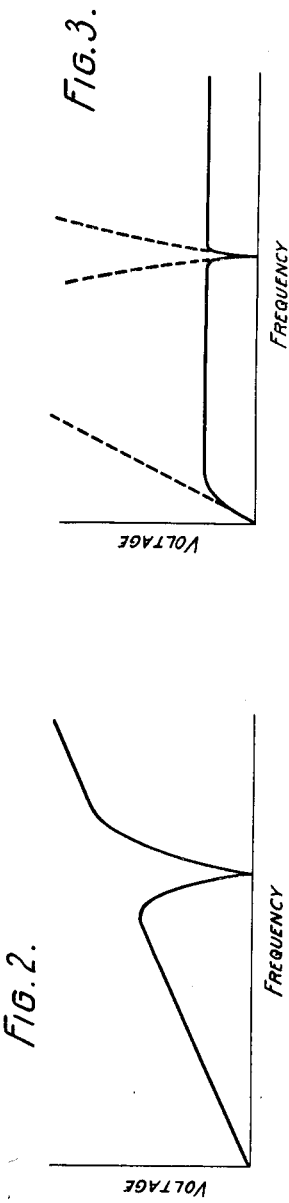
INVENTORS: HUGH M. STOLLER
EDMUND R. MORTON
BY W. Griggs
ATTORNEY Patented July 2, 1929.

1,719,491

UNITED STATES PATENT OFFICE.

HUGH M. STOLLER, OF MOUNTAIN LAKES, NEW JERSEY, AND EDMUND R. MORTON, OF BROOKLYN, NEW YORK, ASSIGNORS TO BELL TELEPHONE LABORATORIES, INCORPORATED, OF NEW YORK, N. Y., A CORPORATION OF NEW YORK.

ELECTRIC REGULATOR.

Application filed June 21, 1927. Serial No. 200,460.

This invention relates to electric regulators and particularly to speed regulators for electric motors.

The object of this invention is to improve the precision and rapidity of the action of electric regulators.

Many types of apparatus, for example, distributors such as are employed in printing telegraph systems are required to be kept in substantially complete synchronism. Not only must they be driven at the same speed but they must be kept in the same phase relation. It is therefore necessary that the speed regulating arrangements employed should be extremely quick acting so as to compensate for variations in operating conditions before any material phase displacements have taken place.

In a specific preferred embodiment, this invention comprises a speed regulator for a direct current motor. An alternating current generator is driven by the motor to obtain a wave of frequency proportional to the speed of the motor. This wave is supplied to one set of opposite terminals of a Wheatstone bridge circuit, one arm of which is comprised of a series resonant circuit tuned to a frequency slightly lower than the frequency of the wave generated when the motor is running at normal speed and the bridge is balanced at that frequency. The output wave from the other set of opposite terminals of the bridge is amplified in an electric discharge amplifier and supplied to the input circuit of an electric discharge detector to control the space current thereof. The regulating field winding is connected to receive the space current of the detector to control the speed of the motor. Space current potential for the amplifier and detector is obtained from a separate armature winding of the motor, and grid biasing potential is obtained from the motor supply, and inductance-condenser and resistance-condenser filters are connected in the leads to reduce the effect of commutator ripples.

The combined effect of the bridge circuit and the amplifier is to give a voltage which varies rapidly with frequency. The amplifier has another important effect in that it serves as a voltage limiting device preventing the application of excessive voltages to the detector when the speed varies considerably from normal. Because of this limiting effect it is possible to use a very high ratio of amplification in the output of the bridge circuit, thereby obtaining high sensitivity at frequencies near the normal frequency.

This invention can be more readily understood by reference to the following detailed description in connection with the drawing in which: Fig. 1 shows diagrammatically one embodiment thereof in a speed regulator for a direct current motor, and Figs. 2 and 3 show curves explaining the operation of the regulating circuit.

Referring to the drawing there is shown in Fig. 1 a speed regulator for a direct current motor 10. This motor is provided with the usual type of armature winding connected to the commutator 11 and with an auxiliary high voltage winding mounted in the same armature slots and connected to the commutator 12. This auxiliary winding acts as a generating winding and provides a source of high voltage direct current for the space current of the discharge devices as hereinafter explained in detail. The motor is provided with a shunt field winding 13 and an aiding regulating field winding 14. Direct current is supplied to the motor from the mains 15.

The toothed rotor 16 of an inductor type alternating current generator is driven by the motor 10. On the stator of the generator are mounted an exciting winding 17 and a generating winding 18. An antiresonant circuit comprising an inductance coil 19 and a condenser 20 is connected across the generating winding 18 to filter out the harmonics.

The generating winding 18 is connected to one set of opposite terminals of a Wheatstone bridge circuit 21 which has a condenser 22 and an inductance coil 23 connected in series in one arm and equal resistances in the other arms. The other set of opposite terminals of the bridge circuit are connected to the primary winding of a transformer 24 which has its secondary winding connected to the input electrodes of a three-electrode electric discharge device 25. The output electrodes of the discharge device 25, which acts as an amplifier are connected to the primary winding of a transformer 26 the secondary winding of which is connected to the input of a second three-electrode electric discharge device 27 which is also operated as an amplifier. The output of this second amplifier is transmitted through a transformer 28 to the input of a third three-electrode discharge device 29 which is operated as a detector. The regulating field winding 14 is connected in the output circuit of the detector 29 in series with the primary winding of a transformer 30, the secondary winding of which is connected in the input of the detector 29. This transformer acts to reduce the hunting action of the circuit as hereinafter explained. A condenser 31 is connected in shunt to the regulating field winding 14 and the primary of the transformer 30 to smooth out the ripples in the space current of the detector 29.

The cathodes of the devices 25, 27 and 29 are connected in series with each other and with the resistance 31 to the direct current mains 15 to receive heating current therefrom. Space current is supplied to the devices from the generating winding connected to the commutator 12. The current supplied to the device 25 is transmitted through both sections of a low pass filter consisting of the series inductance coils 32 and 33 and the shunt condensers 34, 35 and 36. The current supplied to the device 27 is only transmitted through the first section of the filter. Grid biasing potentials for the devices 25, 27 and 29 are obtained by tapping the cathode heating circuit as indicated, resistance 37 and 38 and condensers 39 and 40 being provided to filter these potentials. The low pass space current filter and the resistance condenser filter act to filter out the commutator ripples from the space current and the biasing potentials respectively and thus to prevent irregularities in the operation of the circuit.

The resistances in the bridge circuit 21 are made equal to each other and to the resistance of the inductance coil 23 so that the bridge is balanced at the frequency at which the circuit 22—23 is tuned.

Fig. 2 shows the voltage frequency characteristic of the output wave of bridge 21, the continuous slope being due to the fact that the voltage of the generated wave increased as the speed increases. Fig. 3 shows the voltage frequency characteristic of the output wave of the amplifier. Were it not for the fact that the amplifier overloads the voltage of this wave would rise to abnormally high values, a portion of the voltage characteristic under such circumstances being shown by the dashed line curve. However, the overload characteristic of the amplifier protects the detector 29 from such abnormally high voltages. The circuit is so designed that the frequency of the wave generated when the motor is running at normal speed is slightly above the resonant frequency of the circuit 22—23 so that the regulating circuit operates on the steeply rising portion of the characteristic curve.

The operation of the circuit is as follows: The motor is started by closing the circuit from the mains 15 and accelerates as an ordinary shunt motor, the regulating field winding being opened through the switch 41. When the motor is accelerated to a speed somewhat above normal the switch 41 is closed. Since the motor is now running above normal speed the bridge circuit is unbalanced and a high voltage is supplied to the grid of the detector 29, thus causing a large current to flow through the regulating field winding 14 and causing the motor to slow down until the bridge is very nearly balanced. As the bridge approaches balance the grid voltage of the detector tube decreases until an equilibrium point is reached when the motor operates at a speed slightly above that which gives the exact bridge balance. If the motor tends to slow down, the voltage on the grid of the detector 29 is reduced, correspondingly reducing the current through the regulating field winding 14 and so counteracting that tendency. If the motor tends to speed up the opposite action takes place.

The transformer 30 supplies to the grid of the detector 29 an induced voltage which is proportional to the rate of change of speed of the motor, thereby producing stability and preventing hunting action as is explained in more detail in applicants' Patent No. 1,662,083, dated March 13, 1928.

What is claimed is:

1. In combination, a device having a characteristic to be regulated, means for deriving a wave of frequency proportional to said characteristic, a network having two sets of terminals conjugately related at one frequency, one of said sets of terminals being connected to said means, an electric discharge device having input and output circuits, said input circuit being connected to the other of said sets of terminals, a source of current of characteristics substantially independent of the characteristic to be regulated connected to said output circuit to supply space current to said device, and control means comprising circuits closed through electric discharge devices, said control means being connected in said output circuit and responsive to the magnitude of the space current for controlling the characteristic of said device.

2. A combination according to claim 1, in which one of the electric discharge devices is connected to amplify the wave from said other set of terminals of said network before it is received by another of said discharge devices, said amplifier having such an overload characteristic as to prevent the application of excessive voltages to said other discharge device.

3. In combination, a device having a characteristic to be regulated, means for deriving a wave of frequency proportional to said characteristic, a network having two sets of terminals conjugately related at one frequency and an arm containing a resonant circuit tuned to a frequency differing from the frequency of said wave when said characteristic is normal, one of said sets of terminals being connected to said means, and closed circuits connected to the other set of terminals and comprising space discharge tubes for controlling said characteristic.

4. A speed regulator for an electric motor, comprising means for obtaining a wave of frequency proportional to the speed of the motor, a Wheatstone bridge circuit, one set of opposite terminals of said bridge circuit being connected to said means, an electric discharge device having input and output circuits, said input circuit being connected to receive waves from the other set of opposite terminals of said bridge, a source of current obtained from said motor to supply space current to said discharge device, and a regulating field winding for said motor connected to said output circuit to receive the space current of said device.

5. A speed regulator for an electric motor, comprising means for obtaining a wave of frequency proportional to the speed of the motor, a bridge circuit balanced at a frequency differing from the frequency of the wave obtained from said means when the motor is running at normal speed and having an arm the impedance of which is dependent upon frequency, one set of opposite terminals of said bridge being connected to said means, an electric discharge device having input and output circuits, said input circuit being connected to receive waves from the other set of opposite terminals of said bridge, and a regulating field winding for said motor connected to said output circuit to receive the space current of said device.

6. In combination, a device having a characteristic to be regulated, means for obtaining a wave of voltage proportional to said characteristic, an electric discharge device responsive to said wave and means comprising a thermionic detector tube governed by the space current of said discharge device for regulating said characteristic, said discharge device having such an overload characteristic as to prevent excessive variations in its output and the application of excessive voltage to the means for regulating said characteristic.

7. A regulator for an electric motor, comprising means for obtaining a wave of frequency proportional to the speed of the motor, a network connected to receive said wave and having a characteristic which varies with frequency whereby the voltage of the wave is controlled, an electric discharge amplifier connected to receive the wave from said network, an electric discharge detector connected to receive the wave from said amplifier, and means controlled by the space current of said detector to regulate the speed of said motor, said amplifier having such an overload characteristic as to prevent the application of excessive voltages to said detector.

8. A speed regulator for an electric motor, comprising means for obtaining a wave of frequency proportional to the speed of the motor, a Wheatstone bridge circuit having an arm the impedance of which is proportional to the frequency, one set of opposite terminals of said circuit being connected to said means, an electric discharge amplifier having its input connected to the other set of opposite terminals of said bridge, an electric discharge detector connected to receive the wave from said amplifier and means controlled by the space current of said detector to regulate the speed of the motor, said amplifier having such an overload characteristic as to prevent the application of excessive voltages to said detector.

9. A speed regulator for an electric motor, comprising means for obtaining a wave of frequency proportional to the speed of the motor, a Wheatstone bridge circuit, one set of opposite terminals of said bridge being connected to said means, an electric discharge amplifier having input and output circuits, said input circuit being connected to the other set of terminals of this bridge, an electric discharge detector having input and output circuits, said input circuit being connected to receive the wave from the output circuit of said amplifier, a source of current of frequency substantially independent of the speed of said motor connected to the output circuit of said detector to supply space current thereto, and a regulating field winding for said motor connected to the output circuit of said detector to receive the space current thereof.

10. A speed regulator according to claim 9, in which the amplifier has such an overload characteristic as to prevent abnormal variations in the amplitude of the amplified wave when the speed of the motor varies materially from normal.

11. A speed regulator for an electric motor, comprising means for obtaining a wave of frequency proportional to the speed of the motor, a Wheatstone bridge circuit having an arm the impedance of which depends upon frequency, one set of opposite terminals of said bridge being connected to said means, an electric discharge amplifier having input and output circuits, direct current generating means driven by said motor, a low-pass filter for smoothing the output of said generating means, connections from the output of said filter for supplying space current to said amplifier, connections from the input circuit of said amplifier to the other set of terminals of said bridge, a second electric discharge amplifier having input and output circuits, connections from said filter for supplying space current to said second amplifier, connections from the output of said first amplifier to the input of said second amplifier, an electric discharge detector having input and output circuits, connections from said generating means for supplying space current to said detector, connections from the output circuit of said second amplifier to the input circuit of said detector, a regulating field winding of said motor connected to the output of said detector to receive the space current thereof, and inductive means interconnecting the input and output circuits of said detector, the overload characteristics of said amplifiers being such as to prevent the application of abnormal voltages to the input circuit of said detector.

12. In combination an electric motor, an electric generator driven thereby, a bridge circuit having a resonant circuit in one arm and having one set of opposite terminals connected to said generator, an electric discharge device having input and output circuits, said input circuit being connected to received waves from the other set of opposite terminals of said bridge, a source of current obtained from said motor of characteristics substantially independent of the operating characteristics of said motor connected to said output circuit to supply space current to said discharge device, and means for controlling an operating characteristic of said motor connected to said output circuit.

13. In a regulator system for a motor, an alternating current generator operated by the motor to produce a current having a frequency proportional to the motor speed, a Wheatstone bridge circuit having a resonant arm tuned to a frequency different from the frequency of the current produced by the generator when the motor is operating at normal speed, one pair of opposite terminals of the bridge being connected to said generator, and closed circuits connected to the other two terminals of said bridge comprising space discharge devices for controlling said motor to maintain the speed thereof substantially constant.

14. In a regulator system for a motor, an alternating current generator operated by the motor to produce a current having a frequency proportional to the motor speed, a Wheatstone bridge circuit having a resonant arm tuned to a frequency different from the frequency of the current produced by the generator when the motor is operating at normal speed, one pair of opposite terminals of the bridge being connected to said generator, closed circuits connected to the other two terminals of said bridge comprising space discharge devices for controlling said motor to maintain the speed thereof substantially constant, and means for controlling a space discharge device in said circuits to prevent hunting action.

In witness whereof we hereunto subscribe our names this 17th day of June, A. D. 1927.

HUGH M. STOLLER.
EDMUND R. MORTON.